United States Patent
Suga

(10) Patent No.: US 8,045,004 B2
(45) Date of Patent: Oct. 25, 2011

(54) DISPLAY SIGNAL CONTROL APPARATUS, AND DISPLAY SIGNAL CONTROL METHOD

(75) Inventor: Kazumi Suga, Kanagawa-Ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1184 days.

(21) Appl. No.: 11/670,819

(22) Filed: Feb. 2, 2007

(65) Prior Publication Data

US 2007/0192821 A1    Aug. 16, 2007

(30) Foreign Application Priority Data

Feb. 14, 2006   (JP) ................................ 2006-037249

(51) Int. Cl.
    *H04N 3/20* (2006.01)
(52) U.S. Cl. ...................................... 348/173
(58) Field of Classification Search ................. 348/173, 348/377, 380, 553, 563–569, 584, 588; 345/60–72, 345/690; 715/867, 526, 517, 520
    See application file for complete search history.

(56) References Cited

U.S. PATENT DOCUMENTS

| | | | | |
|---|---|---|---|---|
| 4,198,661 A * | 4/1980 | Gatten et al. | | 348/173 |
| 6,392,695 B1 * | 5/2002 | Watamoto et al. | | 348/173 |
| 6,486,900 B1 * | 11/2002 | Shen et al. | | 715/867 |
| 7,098,875 B2 * | 8/2006 | Onozawa et al. | | 345/60 |
| 7,139,008 B2 * | 11/2006 | Mori et al. | | 345/690 |
| 7,158,169 B1 * | 1/2007 | Farber et al. | | 348/173 |
| 7,305,452 B2 * | 12/2007 | Sakatani | | 709/217 |
| 7,397,497 B2 * | 7/2008 | Murakami et al. | | 348/173 |
| 7,400,363 B2 * | 7/2008 | Suga et al. | | 348/687 |
| 7,414,795 B2 * | 8/2008 | Cok | | 359/649 |
| 7,525,514 B2 * | 4/2009 | Ohno | | 345/60 |
| 7,945,866 B2 * | 5/2011 | Dunko et al. | | 715/867 |
| 2003/0071769 A1 * | 4/2003 | Sullivan et al. | | 345/63 |
| 2004/0257305 A1 * | 12/2004 | Liao et al. | | 345/60 |
| 2005/0157171 A1 * | 7/2005 | Bowser | | 348/174 |
| 2005/0212726 A1 * | 9/2005 | Namba et al. | | 345/63 |

(Continued)

FOREIGN PATENT DOCUMENTS

JP            10-63224         3/1989

(Continued)

OTHER PUBLICATIONS

Japanese Office Action dated Nov. 12, 2010.

(Continued)

*Primary Examiner* — Paulos Natnael
(74) *Attorney, Agent, or Firm* — Fitzpatrick, Cella, Harper & Scinto

(57) ABSTRACT

The present invention displays a broadcast program without causing discomfort to the viewer caused by a shift in the display position. The burn-in of the display apparatus when displaying EPG and GUI images is prevented. When viewing a channel, the timing of events such as the broadcast start time of the next program and the insertion of CM video are acquired from program attribute information such as the SI and metadata. Information such as the time of the next program or insertion of an advert is detected from the attribute information, and video data that is displayed in the display area of the display unit is changed at that time. The change in video data is executed when setting the area of the video data to be applied to the effective video data area to the display area, by changing the coordinate data of this area.

9 Claims, 13 Drawing Sheets

U.S. PATENT DOCUMENTS

| | | | |
|---|---|---|---|
| 2006/0041556 A1* | 2/2006 | Taniguchi et al. | 707/10 |
| 2006/0227250 A1* | 10/2006 | Barbieri | 348/700 |
| 2006/0271994 A1* | 11/2006 | Tada | 725/134 |

FOREIGN PATENT DOCUMENTS

| | | |
|---|---|---|
| JP | 2-268579 | 11/1990 |
| JP | 3-195852 | 8/1991 |
| JP | 5-167874 | 7/1993 |
| JP | 6-66768 | 3/1994 |
| JP | 7-170465 | 7/1995 |
| JP | 2003-195852 | 7/2003 |
| JP | 2004-328520 | 11/2004 |
| JP | 2004-333620 A | 11/2004 |
| JP | 2005-278214 A | 10/2005 |
| JP | 2006-033187 | 2/2006 |
| KR | 0169306 | 3/1999 |
| KR | 2005-0033298 | 4/2005 |

OTHER PUBLICATIONS

Korean Notice of Ground for Rejection dated Nov. 30, 2007, regarding Application No. 10-2007-0014738.

Japanese Office Action issued in the counterpart application No. 2006-037249—3 pages.

* cited by examiner

FIG. 3

| TABLE | PID |
|---|---|
| PAT | 0x0000 |
| PMT | INDIRECT DESIGNATION BY PAT |
| CAT | 0x0001 |
| NIT | 0x0010 |
| SDT | 0x0011 |
| BAT | 0x0011 |
| EIT | 0x0012 |
| RST | 0x0013 |
| TDT | 0x0014 |
| TOT | 0x0014 |
| PCAT | 0x0022 |
| ST | EXCLUDING 0x0000, 0x0001, 0x0014 |
| NULL PACKET | 0x1FFF |

FIG. 4

| DATA STRUCTURE | | NUMBER OF BITS |
|---|---|---|
| Table_ID | | 8 |
| section_syntax_indicator | | 1 |
| reserved_future_use | | 1 |
| reserved | | 2 |
| section_length | | 12 |
| service_id | | 16 |
| reserved | | 2 |
| version_number | | 5 |
| current_next_indicator | | 1 |
| section_number | | 8 |
| last_section_number | | 8 |
| transport_stream_id | | 16 |
| original_network_id | | 16 |
| segment_last_section_number | | 8 |
| last_table_id | | 8 |
| descriptor_loop() | | 0x0000 |
| | event_id | 16 |
| | start_time | 40 |
| | duration | 24 |
| | running_status | 3 |
| | free_CA_mode | 1 |
| | descriptors_loop_length | 12 |
| | (loop) | |
| Descriptor( ) | LINK DESCRIPTOR | |
| | SHORT EVENT DESCRIPTOR | |
| | EXTENDED EVENT DESCRIPTOR | |
| | TIME SHIFT EVENT DESCRIPTOR | |
| | COMPONENT DESCRIPTOR | |
| | CA IDENTIFICATION DESCRIPTOR | |
| | CONTENT DESCRIPTOR | |
| | PARENTAL RATE DESCRIPTOR | |
| | DIGITAL COPY DESCRIPTOR | |
| | AUDIO COMPONENT DESCRIPTOR | |
| | HYPERLINK DESCRIPTOR | |
| | DATA CONTENT DESCRIPTOR | |
| | CA CONTRACT INFORMATION DESCRIPTOR | |
| | SERIES DESCRIPTOR | |
| | EVENT GROUP DESCRIPTOR | |
| | COMPONENT GROUP DESCRIPTOR | |
| | LDT LINK DESCRIPTOR | |
| CRC_32 | | 32 |

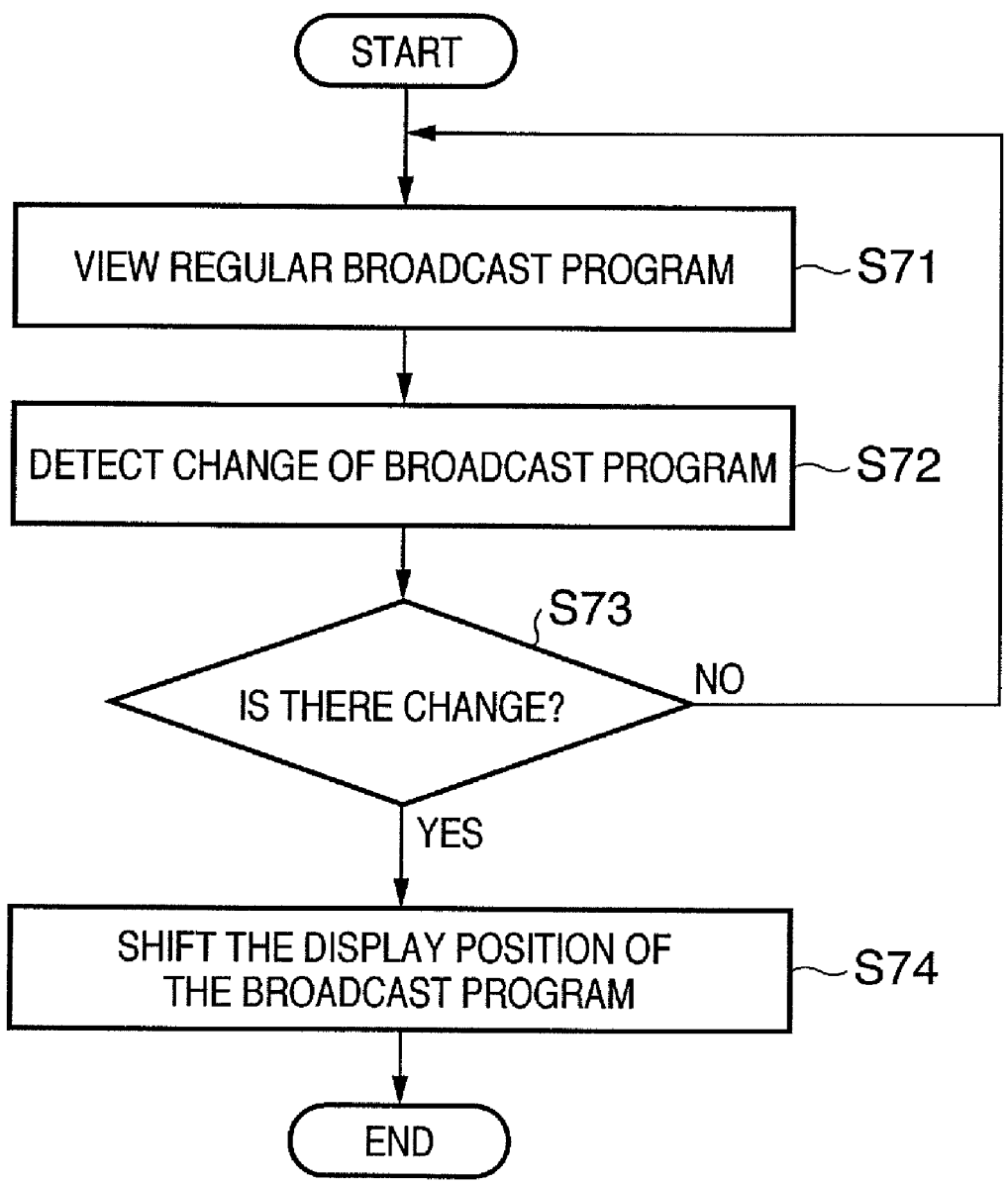

F I G. 9
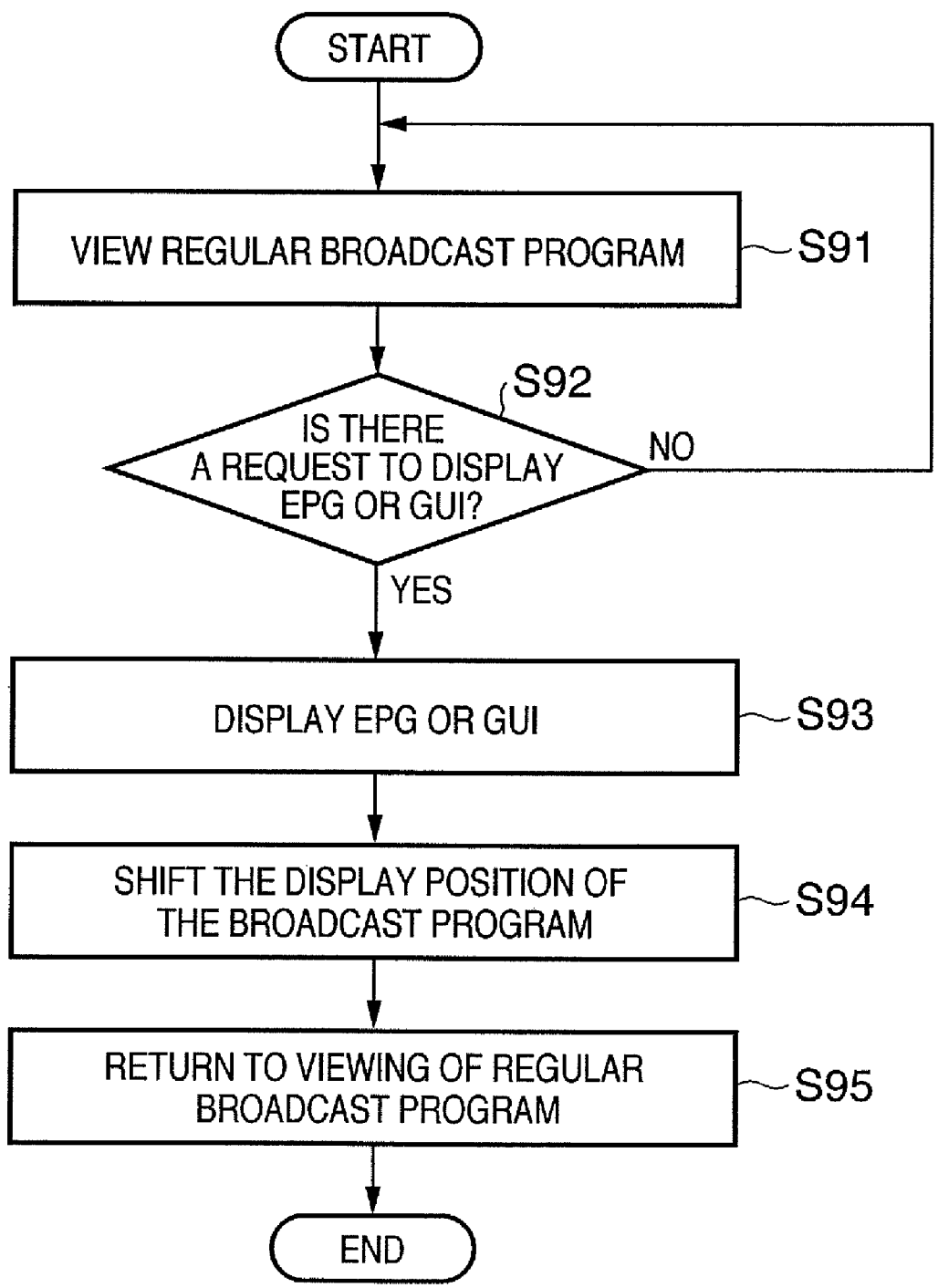

IMAGE QUALITY ADJUSTMENT

▷ BRIGHTNESS

CONTRAST

SHARPNESS

TINT

BRIGHTNESS ADJUSTMENT

80%

DISPLAY SIGNAL CONTROL APPARATUS, AND DISPLAY SIGNAL CONTROL METHOD

BACKGROUND OF THE INVENTION

1. Field of the Invention

The present invention relates to display signal control apparatus provided with methods to avoid burn-in of display apparatus by outputted image signals, display signal control methods, associated programs and storage media.

2. Description of the Related Art

When a display such as a cathode-ray tube (CRT) display, also referred to as the so-called Braun tube, or a plasma display shows the same image continuously for a long period of time, phosphor deterioration occurs only in brightly displayed areas. Consequently, only this part experiences a reduction in the amount of light emitted, generating a so-called burn-in. After prolonged display of the same image on the display apparatus, a viewer will be able to observe this burn-in in the form of unevenness of luminance level. For example, see FIG. 13A.

When the video signal of a broadcast program with an aspect ratio of 4:3 is displayed on a display apparatus with a 16:9 aspect ratio while maintaining a 4:3 aspect ratio, burn-in occurs in the boundary between the image display area and the image non-display area of the display apparatus. In addition, even with a broadcast program with an aspect ratio of 16:9 (known as a full image displaying condition), if an image such as a channel logo or the constant characters, such as a scoreboard of a baseball game, is broadcast for long periods, the patterns of the logo or characters may easily be burnt into the display position. For example, see FIG. 13C.

In addition, there are situations in which the display apparatus shows for long periods images such as an electronic program guide (hereafter referred to as EPG) or a graphic user interface (hereafter referred to as GUI) for various settings and controls. Burn-in occurs frequently in such situations because the EPG and GUI are still images with high contrast.

In order to prevent burn-in during the display of a broadcast program on a display apparatus, there is a method of fixing the display position of a broadcast program and moving it.

Japanese Patent Laid-Open No. 2-268579 discloses a method to shift the display position of an image at regular time intervals. Japanese Patent Laid-Open No. 5-167874 discloses a method to shift the display position of an image when the continuous display time of the image in the specified area exceeds a specified amount of time. Furthermore, Japanese Patent Laid-Open No. 2004-328520 discloses a method to shift the display position of the broadcast program every time the received channel of a television broadcast (broadcast station) is changed, as well as a method to shift the image display position when the difference between the present frame and the previous frame of the video signal is large.

In addition, as a method to prevent burn-in of the EPG and GUI images referred to above, Japanese Patent Laid-Open No. 7-170465 discloses a method of lowering the luminosity of the GUI image of the display apparatus when the GUI image has been displayed for a set amount of time. In addition, as disclosed in Japanese Patent Laid-Open No. 10-63224, there is a method to randomly shift the display position of the GUI image and display luminance level of the display apparatus at each field. Further, as disclosed in Japanese Patent Laid-Open No. 2003-195852, there is a method of shifting the display position of an icon image every time it is displayed.

Although the art described in Japanese Patent Laid-Open Nos. 2-268579 and 5-167874 can prevent burn-in of a display apparatus, they shift the display position of the broadcast program, thereby causing discomfort to viewers when they perceive the shift.

As for the art disclosed in documents such as Japanese Patent Laid-Open No. 2004-328520, in which the broadcast channel display position of the broadcast program is shifted every time the broadcast channel is switched, the display position of the broadcast program is not shifted unless the broadcast channel is changed. Therefore, when viewing a broadcast program on the same channel for a prolonged period, there is the risk of burn-in of the display apparatus. In addition, as disclosed in Japanese Patent Laid-Open No. 2004-328520, when there is a large difference between the previous and present frames, it is possible to prevent burn-in of the display apparatus by switching the displayed screen, i.e., detecting such events as scene changes and shifting the display position of the broadcast program. However, even during one broadcast program there is a plurality of scene changes. For this reason, when there is a scene change, the shifting of the display position of the broadcast program will be perceived by the viewer, e.g., when there has been a movement in the display apparatus of the kind shown in FIGS. 13A to 13B, and FIGS. 13C to 13D.

FIG. 13B shows a situation in which the image in the display apparatus as shown in FIG. 13A has been shifted in an exaggerated fashion from the center to the left side of the display area. In addition, Japanese Patent Laid-Open No. 2004-328520 discloses a technique to prevent burn-in of the display apparatus at the boundary between the video display area and the video non-display area when displaying a side panel or a letter box. In the full image displaying condition, shifting of the display position does not take place. In other words, in this disclosure, there is no way to deal with burn-in of the display apparatus in the full image displaying condition caused by display of channel logos and characters.

On the other hand, the conventional art related to preventing the burn-in of the display apparatus caused by EPG or GUI images, as disclosed in Japanese Patent Laid-Open Nos. 7-170465 and 10-63224, can prevent the burn-in of the display apparatus caused by EPG or GUI images. However, the technique disclosed in Japanese Patent Laid-Open No. 7-170465 causes discomfort in the viewer due to the sudden reduction in luminosity of the EPG or GUI images.

Furthermore, in the technique disclosed by Japanese Patent Laid-Open No. 10-63224, the viewer perceives in units of one field the shifting of the display position or change in luminosity, and this causes discomfort in a similar manner to that caused in the cases of Japanese Patent Laid-Open Nos. 2-268579, 5-167874, and 2004-328520. In addition, in the technique disclosed in Japanese Patent Laid-Open No. 3-195852, if it were assumed that the icon images of this document are EPG or GUI images, it would be necessary to turn the displaying of the images off once and then display them again in order to shift the display position of the images. For this reason, the frequency of shifting the display position would be low, and there would not be a sufficient reduction in the degree of burn-in of the display apparatus. In order to frequently shift the display position of the images, it would be necessary to turn the images on and off repeatedly in a short period of time, and the apparatus would therefore lack severely in user-friendliness.

Accordingly, the present invention has been made in consideration of the above problems, and has as its object to provide a display signal control apparatus, a display signal control method, a program, and a storage medium that are capable of preventing or reducing burn-in of the display apparatus without causing the viewer to feel discomfort while in any viewing mode.

SUMMARY OF THE INVENTION

In order to achieve the above object, the display signal control apparatus of the embodiment of the present invention is a display signal control apparatus for generating video data for displaying a broadcast program on a display unit, and comprises:

a generation unit to generate video data that can be displayed in the display unit;

an acquiring unit to acquire attribute information of the broadcast program displayed in the display unit; and a setting unit to set a video data area which displays the broadcast program in the display unit inside an effective video data area of the video data generated by the generation unit, wherein the setting unit changes the video data area according to the attribute information of the broadcast program acquired by the acquiring unit.

In order to achieve the above object, the display signal control apparatus of the embodiment of the present invention is a display signal control apparatus for generating video data for displaying a broadcast program on a display unit, and comprises:

a generation unit to generate video data that can be displayed in the display unit;

a display control unit to display graphic data in the display unit according to instructions from a user; and a setting unit to set the video data area which displays in the display unit inside an effective video data area of the video data generated by the generation unit, wherein the setting unit changes the video data area if the graphic data is displayed in the display unit.

In order to achieve the above object, the display signal control apparatus of the embodiment of the present invention is a display signal control apparatus for generating video data for displaying a broadcast program on a display unit, and comprises:

a generation unit to generate graphic data to display in the display unit according to instructions from the user;

an accepting unit to accept instructions as input to manipulate the graphic data displayed on the display unit; and a setting unit to set the display position of the graphic data generated by the generation unit, wherein the setting unit, when the accepting unit accepts instructions as input, sets the display position of the graphic data corresponding to the instructions as input generated by the generation unit, to a position different from the display position of graphic data displayed before accepting the instructions as input.

In order to achieve the above object, the display signal control method of the embodiment of the present invention is a display signal control method for generating video data to display a broadcast program in a display unit, and comprises the steps of:

a generation step of generating video data that can be displayed in the display unit;

an acquiring step of acquiring attribute information of the broadcast program for display in the display unit; and a setting step of setting a video data area which displays in the display unit inside an effective video data area of the video data generated by the generation step, wherein the setting step changes the video data area according to the attribute information of the broadcast program acquired by the acquiring step.

According to the present invention, it is possible to prevent or reduce burn-in during the regular use of a television receiving apparatus or a television display apparatus without the viewer noticing any changes.

Further features of the present invention will become apparent from the following description of exemplary embodiments with reference to the attached drawings.

BRIEF DESCRIPTION OF THE DRAWINGS

FIG. 3 is a diagram showing attribute information of a program in order to facilitate the explanation of the embodiment of the present invention;

FIG. 4 is a diagram also showing program information in order to facilitate the explanation of the embodiment of the present invention;

FIG. 7 is a flowchart showing the operation according to the first embodiment of the present invention;

FIG. 9 is a flowchart showing the operation according to the second embodiment of the present invention;

DESCRIPTION OF THE EMBODIMENTS

Preferred embodiments of the present invention concerning a receiving apparatus for television broadcast signals will be described below.

First Embodiment

Figure 1:
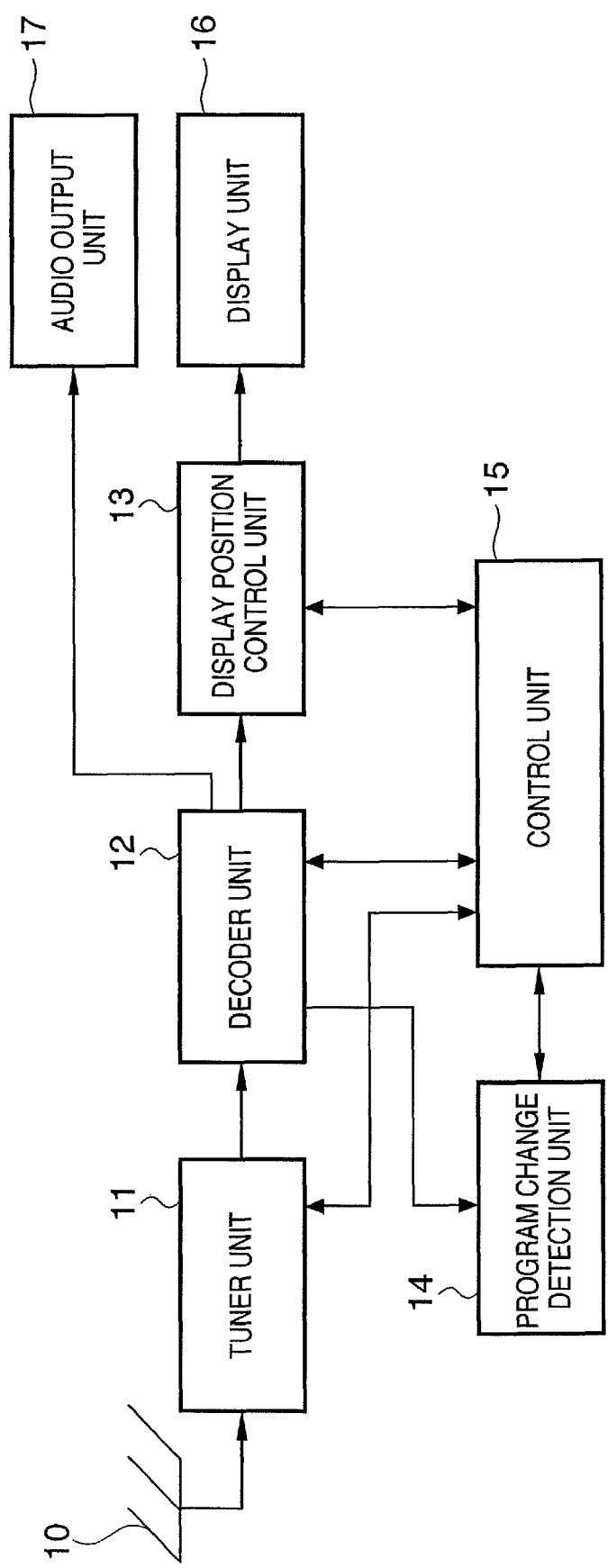
FIG. 1 is a block diagram showing a schematic example of an apparatus according to a first embodiment of the present invention.

FIG. 1 is a block diagram showing a schematic example of a receiving apparatus for a television broadcast signal according to a first embodiment of the present invention. The present receiving apparatus receives a broadcast wave as input from an antenna 10, which is placed externally to the receiving apparatus. The present receiving apparatus is also equipped with a tuner unit 11, a decoder unit (video data generation means) 12, a display position control unit 13, a program change detection unit 14, and a control unit 15. Further, the present receiving apparatus may be built in with an optional display unit 16 and an audio output unit 17, but the display unit 16 and the audio output unit 17 may be set up as an independent display apparatus or audio output apparatus, respectively.

The television broadcast signal received by the antenna 10 is inputted to the tuner unit 11. The tuner unit 11 acquires, through control by the control unit 15, information on the broadcast channel (frequency, TS_ID) it will be receiving. By switching the receiving frequency or receiving channel based on the acquired broadcast channel information, the TS (transport stream) signal of the desired broadcast channel is outputted to the decoder unit 12.

Figure 2:
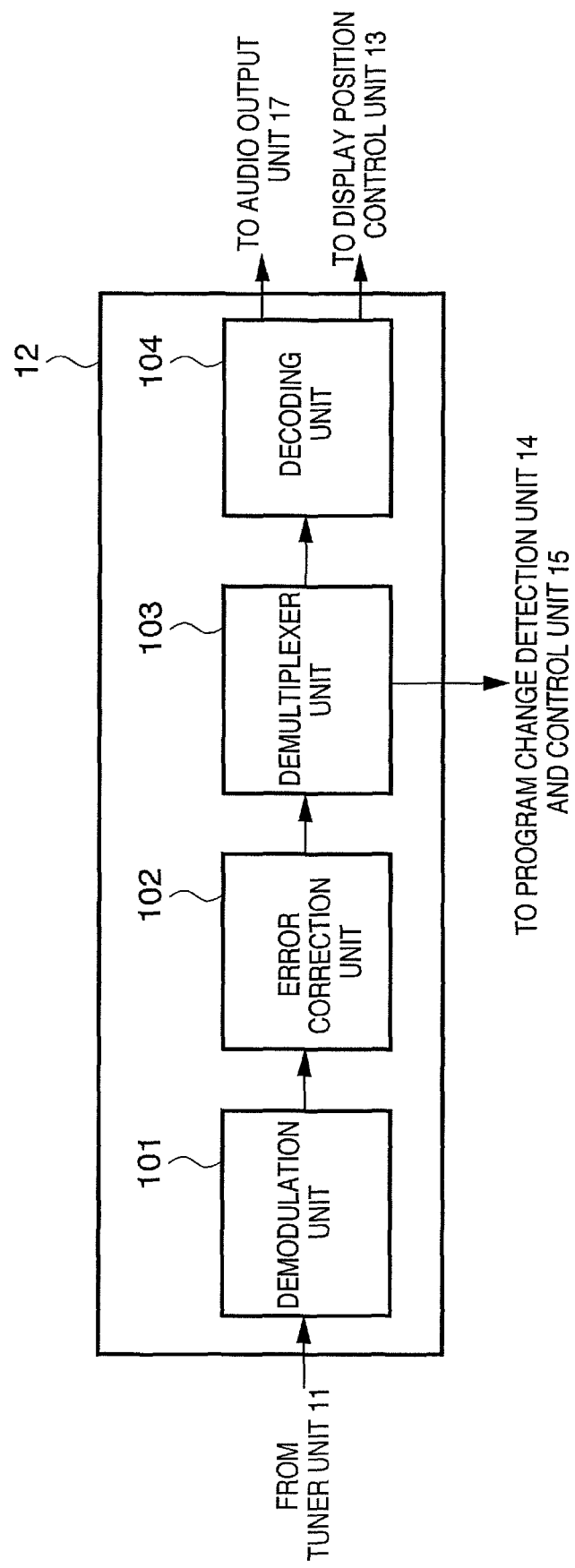
FIG. 2 is a block diagram showing the internal configuration of the decoder unit indicated in FIG. 1.

The decoding process in which video and audio signals are decoded by the decoder unit 12 will be described with reference to the block diagram of FIG. 2.

The TS signal inputted by the tuner unit 11 is demodulated by a demodulation unit 101, and correction for errors by an error correction unit 102. A demultiplexer unit 103 demultiplexes the TS signal which has been multiplexed with video, audio, PSI (Program Specific Information), etc. Demultiplexed video and audio signals are each decoded by a decoding unit 104. In addition, the various types of PSI sections specified by the PID (packet ID) in FIG. 3 are filtered by the demultiplexer unit 103. Then, SI (Service Information) required in order to acquire information on broadcast programs is acquired, and is outputted to the program change detection unit 14 and the control unit 15.

Returning to FIG. 1, the program change detection unit 14 will be described. The defined acquired information is used by the program change detection unit 14 to detect modifications or changes to program contents such as switching to the next broadcast program and switching to a commercial message (referred to as a "CM" hereafter). Modifications to program content are carried out with timing such that it is not possible for the viewer to sense the change in display position of the broadcast program.

Detection of whether there has been a switch to the next broadcast program is made possible by identifying the program broadcast time by acquiring EIT as shown in FIG. 3, and managing it together with the time data of TDT. The start time of the next program can be accurately detected through this method.

SI such as EIT will now be explained. SI comprises 4 tables: SDT (Service Description Table), EIT (Event Information Table), BAT (Bouquet Association Table), and TDT (Time Date Table). Of these, EIT contains information inherent to the broadcast program, as explained in detail in FIG. 4.

The descriptors of EIT are as follows:
1. Short event descriptor (designating the program name and a simple description of program content),
2. Extended event descriptor (designating a detailed description of program content for each item),
3. Component descriptor (designating information on each component of a program, e.g., video quality, aspect ratio, and stereo or monaural audio),
4. Content descriptor (designating the attributes and genre of programs).

In addition, there is a method to detect the timing of a CM by detecting switching to audio multiplexing mode. As alternative methods, there are CM interval detection methods such as the method disclosed in Japanese Patent Publication No. 6-66738 which utilizes a silent interval and scene change.

Detection of CM timing in the present embodiment may utilize the aforementioned publicly known detection methods. Any other detection method may also be used. Of course, if the start and end times of a CM are defined in the SI, it becomes possible to detect the broadcast time of the CM during the program in a manner similar to detection of the broadcast time of a program.

In addition, methods to detect programs and CMs are not restricted to utilizing the EIT of the SI. For example, it is also possible to utilize metadata that has been written in a markup language such as XML. It is believed that content such as programs will be controlled by the substance of the content and the control attributes defining metadata, not only in regular broadcasting but also in next generation broadcasting environments such as server type and IP broadcasting. Using metadata, it is possible to define the broadcasting time and contents therein. In other words, metadata and SI contain attribute information of program contents, and by acquiring this attribute information, the present invention is capable of detecting program changes.

The display position control unit 13 performs, under the control of the control unit 15, the process of shifting video data shown on the display unit 16 within the effective video data area. In other words, the process in which the area within the effective video data area that is set in the video data is changed. The schematic diagrams in FIGS. 5A to 5C will be used to explain an example of the shifting of the program display position executed by the display position control unit 13.

Figure 5A:
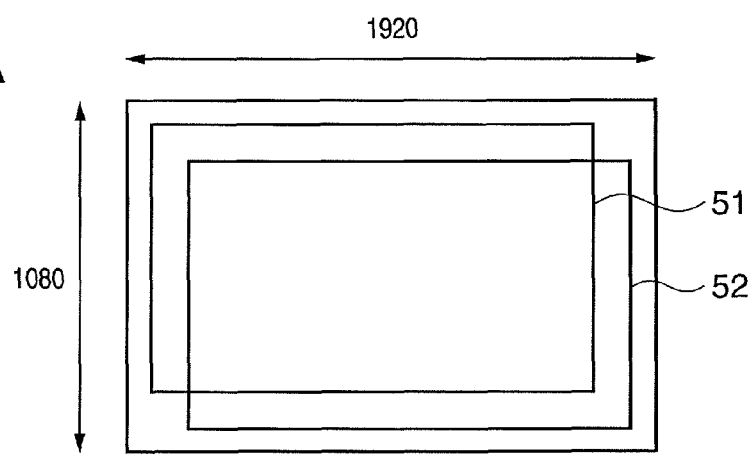
FIGS. 5A-5C are schematic diagrams showing the shifting of the display position according to the present invention.
Figure 5B:
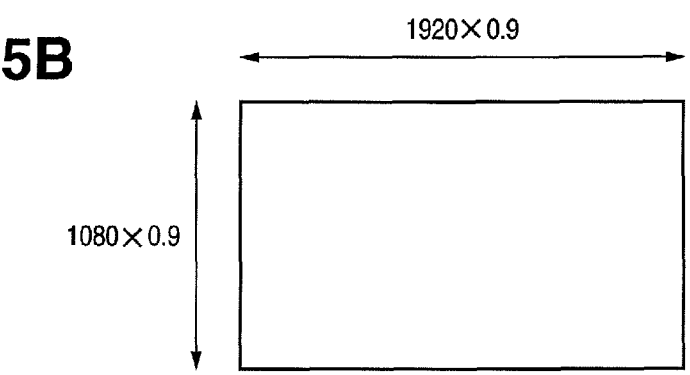
Figure 5C:
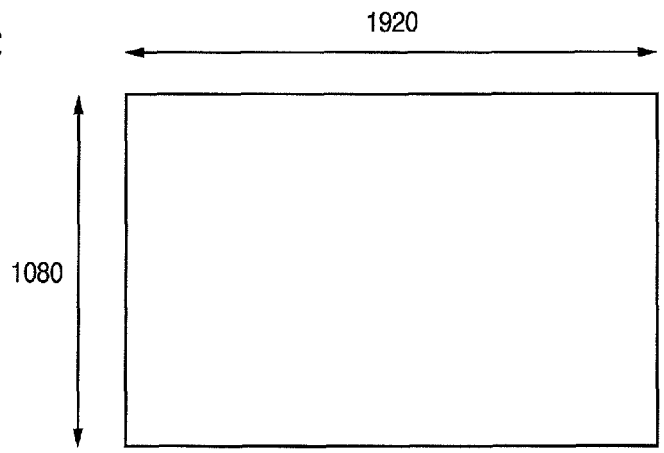

Normally, it is assumed that a television broadcast signal is overscanned. Video data that is sent from the broadcasting station has an effective video data area and a blanking area that runs horizontally and vertically. Here, the effective video data area is the area in which the program video is displayed, and the blanking area is the area other than the video data area. The display apparatus extracts 90-95% of the effective video data area of the demodulated video signal, so that the blanking area is not displayed in the display area. An example of this is shown in FIGS. 5A to 5C. FIG. 5A demonstrates overscanning video data at 90%, when the effective video data area is 1920 pixels horizontally and 1080 pixels vertically. In FIG. 5B, video data of 1920 pixels horizontally and 1080 pixels vertically is trimmed (extraction) respectively to 1920×0.9 (=1728) pixels and 1080×0.9 (=972) pixels. In other words, extraction of the video data area is carried out so as to achieve a horizontal and vertical size of 90%. The trimmed video data is subjected to a scaling process according to the resolution of the display unit 16. For example, as shown in FIG. 5C, if the resolution of the display unit 16 is horizontally 1920 pixels and vertically 1080 pixels, the image is expanded by 10/9 in both the horizontal and vertical directions.

By configuring in this manner, 90% of the received effective video data area is displayed as full-sized in the display area of the display apparatus. Conventionally, this extraction process has always been performed at a certain extraction position (pixel coordinate). When overscanning, the amount of reduction in extraction that occurs is determined by the manufacturer of the receiving apparatus. Consequently, the pixel coordinates of the image area that is extracted are automatically determined by this reduction amount. Typically, the determined coordinate values are stored in the register, and the extraction unit (not shown in drawings) performs extraction using these coordinate values. In the present embodiment, the display position control unit 13 has the extraction processing unit and the scaling processing unit.

As shown as in FIG. 5A as reference numerals 51 and 52, the present invention performs the process of changing the position of extraction during overscanning. That is, the process successively shifts the video data area displayed in the display area of the display unit 16 inside the effective video data area at the time of program change or when shifting to CM.

Figure 6A:
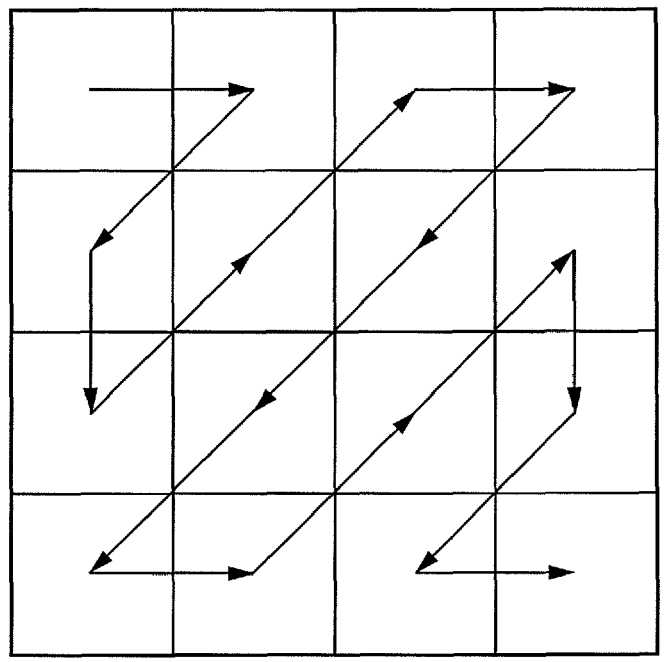
FIGS. 6A and 6B are schematic diagrams also showing the shifting of the display position according to the present invention.
Figure 6B:
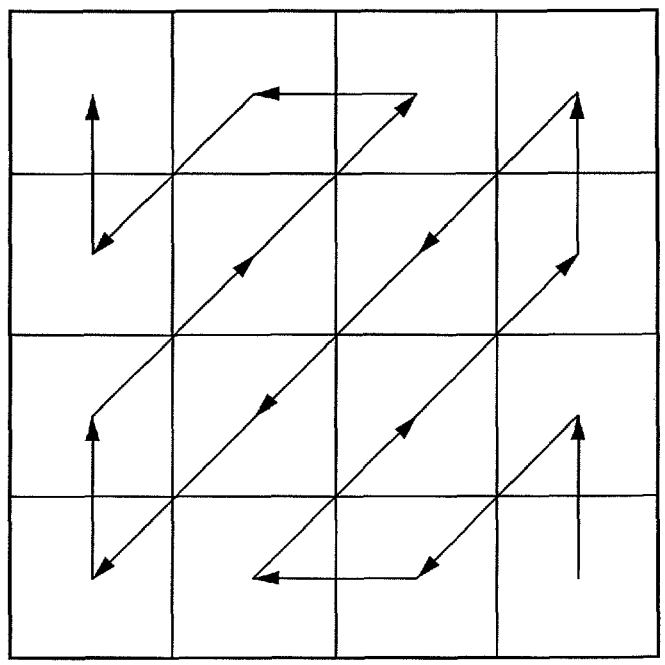

In order to minimize the possibility that the viewer will notice a shift in the display position of a broadcast program, it is best to reduce the shift amount during a given shift. Also, in order to deal with burn-in of the edge of the image in any direction, it is preferred that the shift be in both vertical and horizontal directions. Thus, it is preferred that the reference points used when performing extraction during overscanning be shifted in a zigzag pattern, as shown, e.g., in FIGS. 6A and 6B. FIGS. 6A and 6B are drawings showing the reference points used for extraction in a 4×4 pixel area. In the Figures, each arrow indicates a single shift. By shifting in the manner shown in FIG. 6B after shifting in the manner shown in FIG. 6A, it is possible to shift over the entire 4×4 pixel area. Of course, the shifting pattern shown in the above Figures are but one example, and the order or direction of shifting need only satisfy the requirement that it not be perceivable by the viewer. Further, the shift area (a 4×4 pixel area in the case of FIGS. 6A and 6B) can be set so that the video size determined by the extraction reduction does not include the area outside of the image area transmitted by the video signal. An embodiment for implementing the present invention will be described below.

As described above, conventional video data extraction involves the use of a single extraction reference position (coordinate value). By contrast, an embodiment of the present invention is configured so that multiple pre-determined extraction reference positions are used. For example, the multiple pre-determined extraction reference positions (pixel coordinate values) can be stored in a table (not shown in drawings) according to the order of shifting. Here, the structure of the table is not set. When the program change detection unit 14 detects a change in the program, the control unit 15 extracts the image according to the next extraction reference position. For this purpose, the register value, which is the image coordinate value used for extraction of images by the display position control unit 13, is re-written with the coordinate value of the next extraction reference position. The display position control unit 13 uses the re-written coordinate value and performs image extraction. By changing the extraction position of the image, the video shown on the display unit 16 is altered before and after the change of extraction position.

For example, with respect to a channel logo that is always shown at a predetermined position of the video data, the logo is always displayed at a predetermined pixel position in the display area of the display unit 16, when extraction is always performed at the same position. However, in the present embodiment of the present invention the video data used for displaying in the display area of the display unit 16 is changed before and after the change in the extraction position, because the extraction position in the effective video data area is changed according to the attribute information of the program. That is, the display area inside the effective video data area is set according to the attribute information of the program. Therefore, in essence, the display position of the logo is shifted from the absolute position of the display area of the display unit 16. Through this process, it is possible to reduce or avoid the burn-in that occurs in the display unit 16 when a logo or character is constantly displayed in the display position.

The display unit 16 is a display device such as a CRT or plasma display, which, as described above, displays the video signal of the broadcast program outputted by the display position control unit 13 and shows it to the viewer. The display unit 16 can be set up separately from the receiving apparatus. Also, the audio output unit 17 includes an amplifier or speaker, and outputs as audio the audio signal that is broadcast together with the video signal. The audio output unit 17, like the display unit 16, can be set up separately from the receiving apparatus.

The control unit 15 controls the tuner unit 11 for tuning into a channel, as well as the decoder unit 12. The control unit 15 also acquires the SI, controls the display position control unit 13 and the program change detection unit 14. The flowchart of FIG. 7 will be used to explain how shifting of the display position can be executed without the viewer perceiving the shift.

As described above, the control unit 15 controls the tuner unit 11 and the decoder unit 12 in order to tune into the desired channel. The control unit 15 also displays the television broadcast program in the display unit 16 (Step S71). However, during this process, as indicated in Step S72, the SI is acquired from the demultiplexer unit 103 of the decoder unit 12, and the change in the broadcast program is constantly detected. If at Step 73 the change in broadcast program is detected by the program change detection unit 14, the process proceeds to Step S74. As described above, a change in the broadcast program indicates a switch to the next program or a switch from the main program to a CM and vice versa.

At Step S74, the control unit 15 controls the display position control unit 13, and shifts the display position of the broadcast program. This shifting process of the display position is achieved by changing the position settings of the video data area. However, if at Step S73 a change in the broadcast program is not detected, the process returns to Step S71 and the detection operation is continued during regular program viewing. Obviously, even after a shift of display position has taken place at Step S74, as long as the viewing of the program is continued, the present flowchart continues to be executed.

As described above, according to the receiving apparatus for television broadcast signals described in the first embodiment of the present invention, changes such as switching to the next program or to a CM are detected from the program information defined in the SI (program placement information) and EIT (Event Information Table). The program display position is then shifted according to the detected timing. Usually, during a switch to the next program or CM, the scoreboard in a baseball broadcast is removed, or there is a change in the aspect ratio from that at the time of program filming, and a video non-display area is added or removed. Thus, the display information itself changes to an image that differs from what it was before. Therefore, by changing the display position of a broadcast program to coincide with this timing, burn-in can be avoided without having to manipulate the channel manually or providing the viewer with a sense of discomfort due to a change in the displayed image.

Moreover, the present embodiment described above is configured so that the video data is subject to trimming (extraction) from the effective video data area, and the trimmed data is enlarged and displayed in the display area of the display unit 16. However, it is not absolutely necessary for the video data to be trimmed. By setting the display data area of the effective video data area and scaling the area size of the display data area so that it adapts to the display area size of the display unit 16, an effect identical to that of the present embodiment can be achieved. For example, when it is necessary to generate video data that is full-size (100%) with respect to the display screen using 90% of the image area of the effective video data area (FIG. 5A), video data that is 10/9 times the size is generated. Next, the video data is overscanned so that the original area of 90% will fit with the display area.

Second Embodiment

Next, the second embodiment of the present invention will be described, but it is first necessary to explain the difference between the first embodiment of the present invention and the second embodiment.

As explained above, in the first embodiment of the present invention, a shift in the program display position was achieved without the viewer noticing it by shifting the program display position to coincide with the time at which there is a change in the content of the broadcast program, such as a switch to a CM. However, according to the second embodiment of the present invention, the display position of the broadcast program is shifted without the viewer noticing it by timing the shifting of the display position of the broadcast program to coincide with the timing at which EPG or an adjustment GUI image is displayed. The second embodiment of the present embodiment as summarized above will be described in greater detail below with reference to the drawings.

Figure 8:
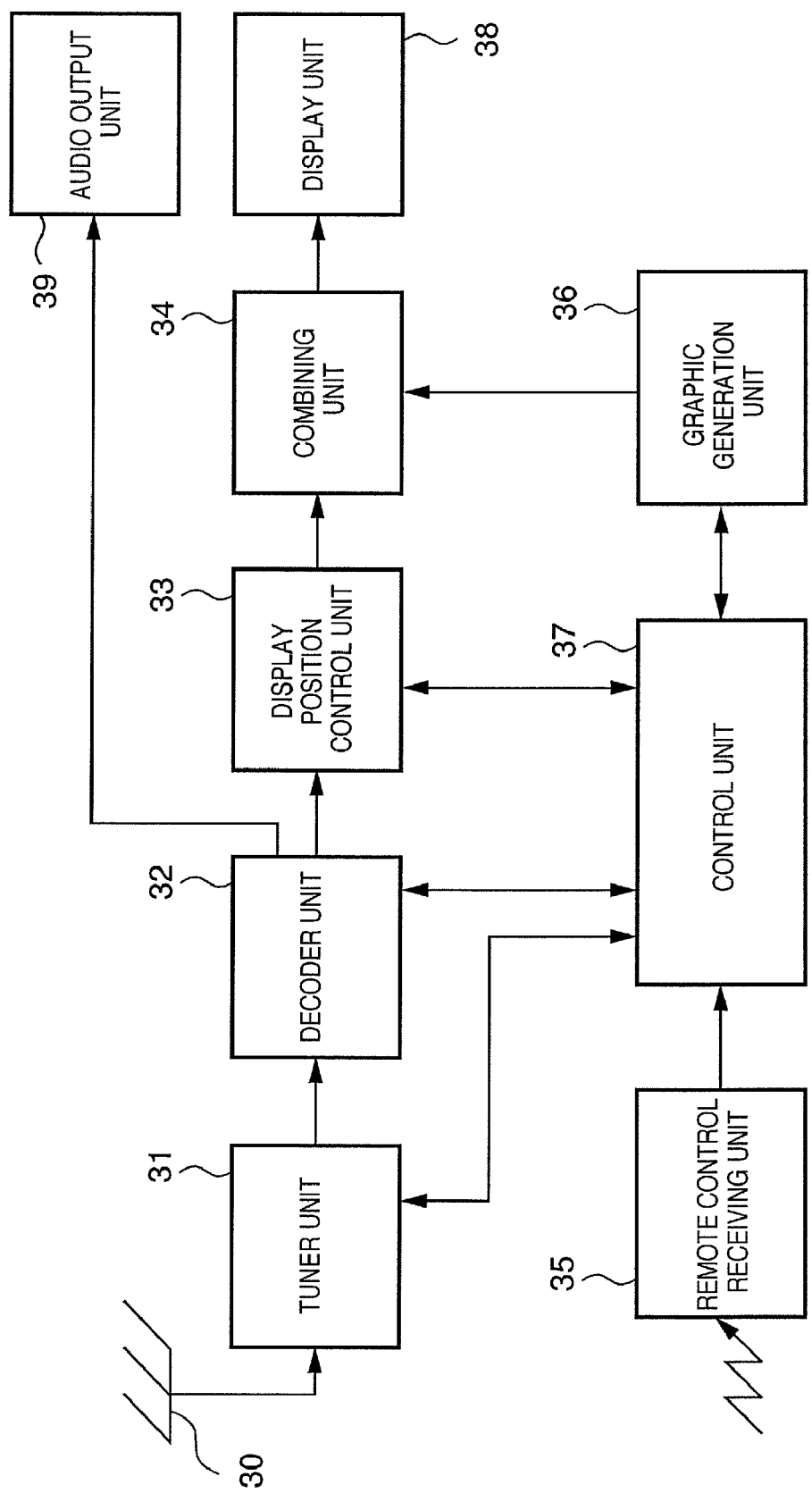
FIG. 8 is a block diagram showing a schematic example according to second and third embodiments of the present invention.

FIG. 8 is a block diagram showing an example of the configuration of the receiving apparatus of a television broadcast signal according to the second embodiment of the present invention. The block diagram of FIG. 8 comprises an antenna 30, a tuner unit 31, a decoder unit 32, a display position control unit 33, a combining unit 34, a remote control receiving unit 35, a graphic generation unit 36, and a control unit 37. Moreover, it is possible to add a display unit 38 and an audio output unit 39, but, as in the first embodiment of the present invention, it is not necessary to add these optional components.

An explanation of the antenna 30, the tuner unit 31, the decoder unit 32, the display position control unit 33, the display unit 38, and the audio output unit 39, will be omitted as they are identical to the corresponding components in the first embodiment of the present invention.

The combining unit 34 outputs the graphic data outputted by the graphic generation unit 36 to the display unit 38, after combining the graphic data into program data that is currently being viewed and which has been outputted by the display position control unit 33. A plurality of possible combining methods exist, including a method of combining program data by transmitting graphic data at an arbitrary transmission rate, and a method of displaying only graphic data in the display unit 38 by completely blocking program data. It is possible to use any given method in order to combine images. Moreover, with regard to the display area of graphic data, there is a method of displaying the graphic data in a part of the display area, and a method of displaying the graphic data in the entire display area. It is possible to implement the present invention using any display method, but it is preferable to display graphic data in the entire display area in order to prevent the viewer from noticing a change in the display position of the broadcast program.

The remote control receiving unit 35 is an accepting unit which receives the infrared pulse signal from the viewer's remote control (not shown in drawings), used for displaying and controlling EPG or adjustment GUI images. The received signal is outputted to the control unit 37 described below. The control unit 37 analyzes the remote control code. The graphic generation unit 36, based on the results of the analysis by the control unit 37 of the viewer's remote control operation, outputs to the combining unit 34 generated graphic data such as EPG or adjustment GUI images.

Next, the control unit 37 will be described with reference to FIG. 8 and the flowchart of FIG. 9. The control unit 37 controls the tuner unit 31 for tuning into a channel, as well as the decoder unit 32. The control unit 37 also acquires the SI, controls the display position control unit 33 and the graphic generation unit 36, and analyzes the remote control pulse signal from the remote control receiving unit 35.

Therefore, as described above, the control unit 37 controls the tuner unit 31 and the decoder unit 32 in order to tune into the desired channel. The control unit 37 also displays the television broadcast program in the display unit 38 (Step S91). However, during this process, the SI is acquired from the demultiplexer unit 103 of the decoder unit 32, and the acquired SI is reflected in the generation of the graphic data of EPG. Next, if at Step S92 there is a request from the viewer to display EPG and adjustment GUI images, the process moves on to Step S93, where graphic data such as EPG and adjustment GUI images are generated by the graphic generation unit 36 and then outputted. Next, at Step S94, the control unit 37 controls the display position control unit 33, and shifts the program display position using the methods described above in the first embodiment of the present invention. Next, when there is a program display request from the viewer, the displaying of EPG and adjustment GUI images is stopped, and the displaying of the regular program is resumed. At Step S92, if there is no request from the viewer to display EPG or adjustment GUI images, the process is continued until a display request is detected during viewing of the regular program.

Here, during Steps S93 through S95, it is preferable to shift the program display position, i.e., change the extraction position of the image, before displaying the regular program in Step S95. After displaying EPG and GUI images, the extraction position of the images should be changed before switching to regular program display so that the viewer will be less likely to notice that the image displayed in the display area has shifted. Therefore, the display position control unit is put into operation by the control unit 37 from the time that EPG and GUI images are displayed in the display area to the time of returning to program images.

According to the receiving apparatus of television broadcast signals in the second embodiment of the present invention, it is possible to shift the program display position through the process of displaying EPG or adjustment GUI images of various types during program viewing. Consequently, it is possible to avoid burn-in without having to wait for the program to switch, and without the viewer feeling discomfort from a shift in program display position. Of course, it is possible to increase the effect of preventing burn-in by implementing both the above first and second embodiments of the present invention, as this will enable the display position of a broadcast program to shift at a higher frequency.

Third Embodiment

The third embodiment of the present invention will now be described. First, the difference between the third embodiment and the first and second embodiments will be explained.

In the first and second embodiments of the present invention, the display position of a broadcast program is shifted without being perceived by the viewer, in a manner so as to prevent burn-in generated in the boundary between the logo or video non-display area of both sides during broadcasting of a program. The third embodiment of the present invention has as its object to prevent burn-in caused by graphic data itself. Such graphic data includes EPG and adjustment GUI images. To achieve this end, the display position of the graphic data is shifted according to the timing of the change in graphic data.

The third embodiment of the present invention will be explained with reference to the drawings. The receiving apparatus for receiving television broadcast signals according to the third embodiment of the present invention will be explained using the block diagram of FIG. 8, described in the second embodiment of the present invention above. Except for control unit 37, all components are the same as those of the first and second embodiments of the present invention, and therefore an explanation of them will be omitted.

The control unit 37 of the third embodiment of the present invention controls the tuner unit 31 for tuning into a channel, as well as the decoder unit 32. The control unit 37 also acquires the SI, controls the graphic generation unit 36, and analyzes the remote control pulse signal from the remote control receiving unit 35. These are basically the same as the second embodiment of the present invention.

Figure 10:
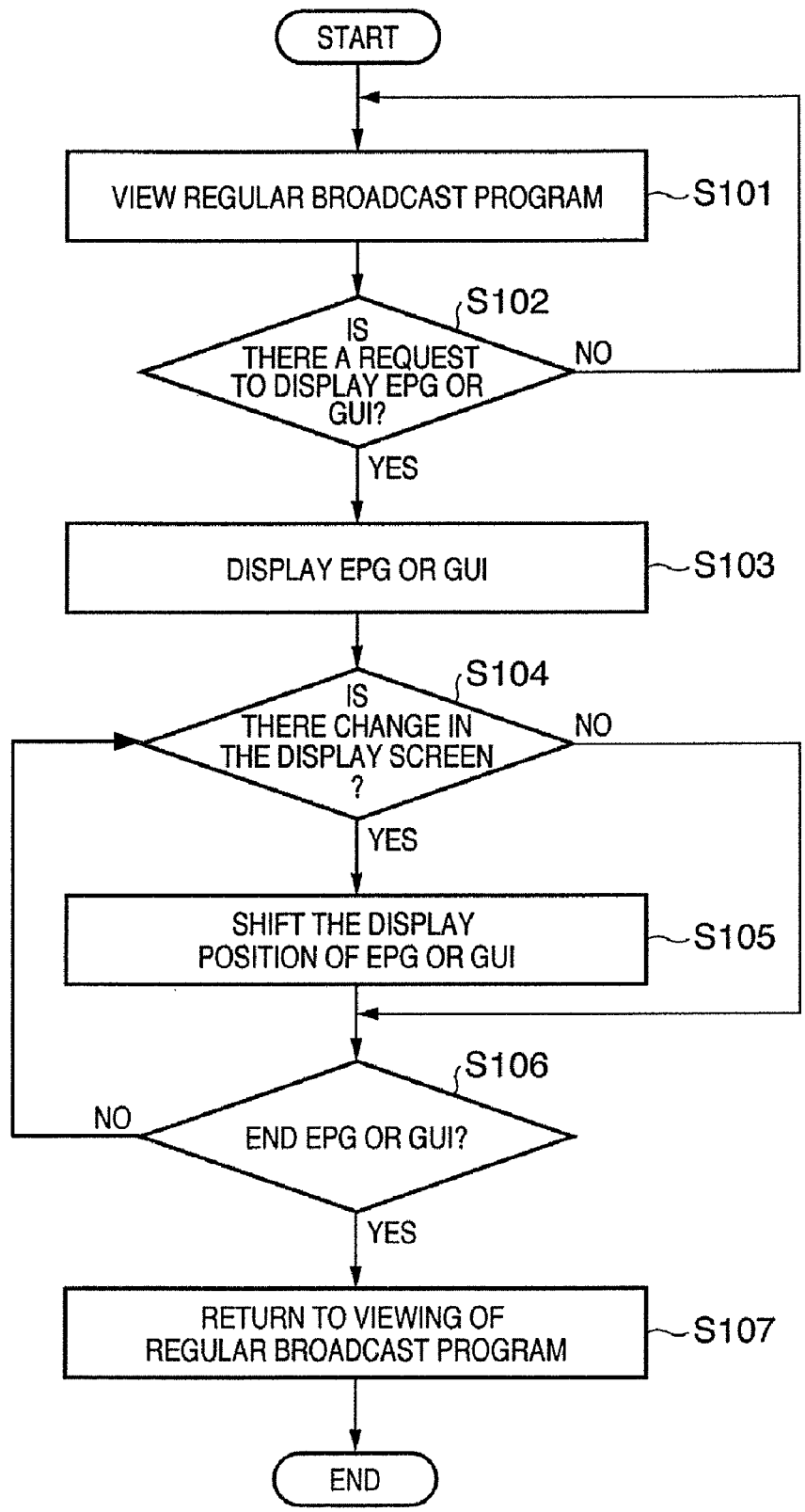
FIG. 10 is a flowchart showing the operation according to the third embodiment of the present invention.

The flowchart of FIG. 10 will be used to describe the control of the shifting of the display position of graphic data such as EPG and adjustment GUI images, without the shifting being noticed by the viewer.

The control unit 37, as described above, controls the tuner unit 31 and the decoder unit 32 in order to tune into the desired channel. The control unit 37 also displays the television broadcast program in the display unit 38 (Step S101). However, during this process, the SI is acquired from the demultiplexer unit 103 of the decoder unit 32, and the acquired SI is reflected in the generation of the graphic data of EPG. Next, if at Step S102 there is a request from the viewer to display EPG and adjustment GUI images, the process moves on to Step S103, where graphic data such as EPG and adjustment GUI images are generated by the graphic generation unit 36 and then outputted. After displaying the graphic data, the viewer browses this display and, if required, carries out the operation in order to make the transition to another screen.

At Step S104, it is detected whether there is a need for changing the displayed image based on the results of the above operation. If it is determined at Step S104 that a change in the displayed image is necessary, the process moves to Step S105, where EPG and adjustment GUI images are changed by controlling the graphic generation unit 36, and where the process of shifting the display position of the image is executed. Details of the process of shifting display positions are described below. Moreover, at Step S102, if there is no request to display EPG or adjustment GUI images from the viewer, the process is ended returns to Step S101. Furthermore, Step S106 detects whether or not an instruction to end the display of EPG or adjustment GUI images has been inputted. In the case that such an instruction has been inputted, the process moves on to Step S107. At Step S107, the display of graphic data is stopped and regular program viewing is resumed. Until an instruction to end the display of graphic data has been inputted at Step S106, the process returns to Step S104, and executes the detection of whether or not the display image has changed.

Conventionally, the display area of EPG and GUI adjustment images has been set to the same specific display area. That is, the display area of graphic data is pre-determined at a specific coordinate position. In the present embodiment, it is possible to shift the display position of graphic data when there is a change in images, by setting a plurality of coordinate positions that display graphic data. Therefore, the process of shifting the display position of graphic data consists of the step of changing the display coordinates of previous graphic data to the display coordinate of different graphic data, at the time of a change such as the switching from the displayed graphic data to different graphic data.

Specific examples of the method used to shift the display position of the above EPG or GUI images after adjustment will be described below with reference to FIGS. 11A-11D, 12A, and 12B. First, the case of EPG will be considered in giving specific examples of a method of shifting the display position.

Figures 11A, 11B, 11C, 11D:
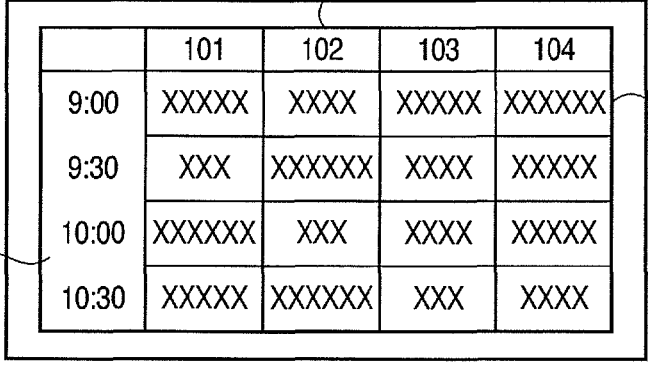
FIGS. 11A-11D are schematic diagrams showing the shifting of the display position according to the third embodiment of the present invention.

FIGS. 11A-11D show examples of a method to shift the display position of EPG. FIG. 11A is assumed to represent the initial display condition. Reference numeral 131 denotes the display area frame of the display unit 38. Reference numeral 132 denotes the time display area of the EPG screen. Reference numeral 133 denotes the channel information display area of the EPG screen. Also, reference numeral 134 denotes the EPG screen itself.

An example will be considered in which the viewer inputs the instruction to scroll the EPG image in the vertical direction (time axis direction) in order to view information concerning a program to be viewed in the future. In this case, conventionally, an image in which the time display area and the program information area of FIG. 11A has been changed is generated and displayed. However, in the case of the third embodiment of the present invention, as shown in FIG. 11B for example, the display position of the EPG screen can be shifted when displaying the changed image. Moreover, in FIG. 11B, the display position of the EPG screen is shifted in the vertical direction in a manner similar to the change from FIGS. 11A to 11B, which is related to the fact that the operation of EPG by the viewer is the operation of virtually shifting in the vertical direction the information (program information) displayed on the screen. By performing smooth switching of the display of FIGS. 11A and 11B, the viewer perceives that only the information displayed in the program information display area in FIGS. 11A and 11B have changed. Furthermore, since the information being displayed in the display area is in the vertical direction, it is difficult to notice a vertical shift of the entire display image.

By shifting the display position of the change in the contents of the display screen and the display screen itself in the same direction, the present embodiment takes advantage of characteristics in human perception and psychology in order to make it difficult for the viewer to notice any shift. Needless to state, the amount of shifting of the display images that is carried out is equal to the minimum shift amount that would have the effect of preventing the burn-in of the display apparatus. In the present embodiment, as in the aforementioned first embodiment, a shift amount of only 1 pixel is enough to prevent burn-in of the display apparatus.

For example, if the viewer scrolls in the horizontal direction (channel axis direction) in order to view the program information of the next channel (after channel 105), the display position of the EPG image is shifted in the horizontal direction, as shown, e.g., in FIG. 11C. This shift can be thought of as being equivalent to a shift in the vertical direction described above. In the case where the image content is shifted in the horizontal direction, the entire display image is shifted in the horizontal direction and displayed.

Moreover, it is also possible to shift the display position of the EPG image in the diagonal direction, as shown in FIG. 11D. In addition, when scrolling in the vertical and horizontal directions arbitrarily, it is possible to shift the display position in a zigzag pattern, as described in the first and second embodiments using FIGS. 6A and 6B.

It is assumed that only a part of the display area of the display unit 38 will display the EPG screen described above.

In this case, every time the display screen is changed, prevention of burn-in is achieved by shifting the display position of the display screen. However, when displaying graphic data such as an EPG screen in the entire display area, image data larger than the display area is generated, as in the first embodiment. Then, by performing the process of changing the extraction position of the generated image data, it is possible to achieve the same effect as actually shifting the display position.

Figures 12A, 12B:
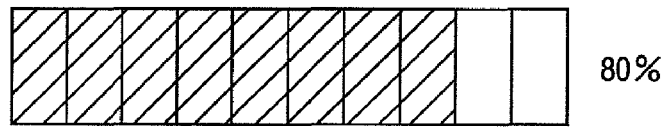
FIGS. 12A and 12B are diagrams showing the movement of the display position according to the third embodiment of the present invention.
Figure 13A:
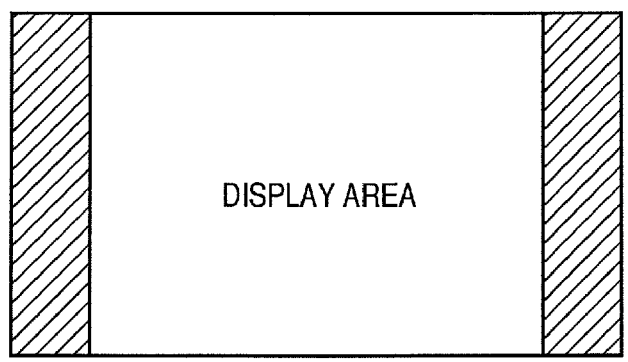
FIGS. 13A-13D are schematic diagrams showing the conventional art.
Figure 13B:
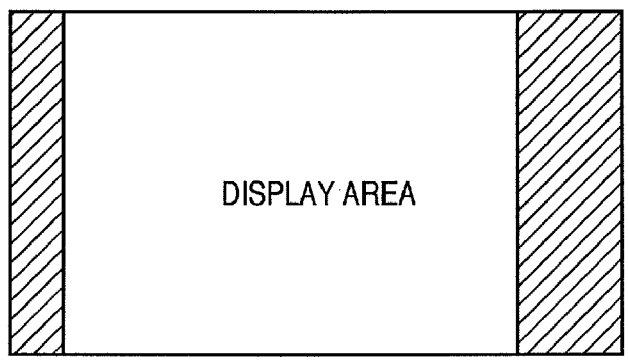
Figure 13C:
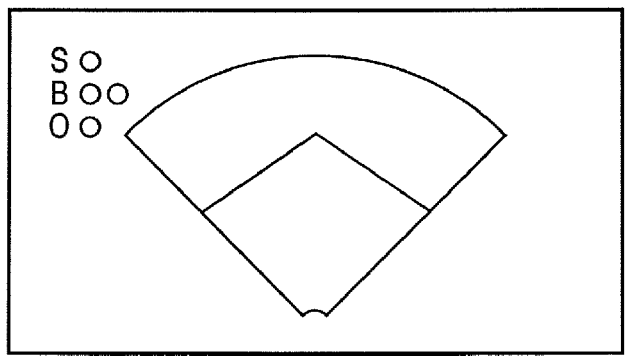
Figure 13D:
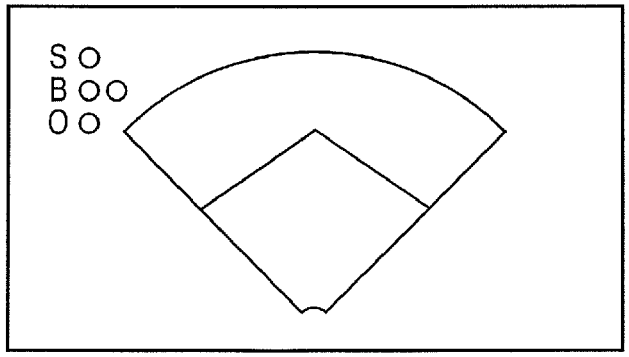

Next, specific examples of shifting the display position of the GUI image for adjustment will be described. FIGS. 12A and 12B show an example of a method of shifting the display position of a GUI image for adjustment. It is now assumed that an adjustment menu screen of the GUI image for adjustment as shown in FIG. 12A is displayed. Here, if the viewer selects brightness adjustment, normally the display is switched to the brightness adjustment screen shown in FIG. 12B. This involves the process of changing the screen from the adjustment menu screen to the brightness adjustment screen. In the third embodiment of the present invention, the display position of the GUI image is shifted and displayed. The shift direction can be in a zigzag pattern, as described in the first and second embodiments using FIGS. 6A and 6B, or in a different manner.

The shift amount of the graphic data shown in the aforementioned FIGS. 11A to 11D, 12A, and 12B, are made larger in the drawings to facilitate understanding. In actual terms, as explained in the first embodiment of the present invention, the viewer will be less likely to notice a change if the shift amount is about one pixel (1 pixel in both vertical and horizontal directions if the change is in the diagonal direction.)

According to the receiving apparatus of the television broadcast signals of the third embodiment of the present invention, when changing the contents of the display of graphic data for displaying EPG and GUI image for adjustment, the display position of the graphic data itself is shifted. For this reason, it is possible to prevent the viewer from feeling discomfort due to the shift in display position, while at the same time effectively preventing burn-in.

Thus, three embodiments of the present invention have been described. Even if only one of the three embodiments is implemented, burn-in can still be reduced or prevented. Of course, if all of the embodiments are implemented, the burn-in originating from the display of graphic data can be prevented. Therefore, when implementing the present invention to a product, it is preferred that all three embodiments be implemented.

Moreover, each embodiment of the present invention used television broadcasting to give examples, but the present invention can be applied to internet broadcasting or to a receiving apparatus for receiving video-on-demand video signals.

Furthermore, the object of the present invention can also be fulfilled by supplying to the system or apparatus a storage medium storing the program code for a software application that implements the functions of the abovementioned embodiments. That is, the object of the present invention is also achieved if the computer (or CPU or MPU) of that system or apparatus reads out the program code stored in the storage medium and executes the program code. In this case, the program code itself which has been read out from the storage medium executes the function of the abovementioned embodiment, and it can be said that the storage medium on which the program code is stored serves as the present invention.

As a storage medium for supplying program code, it is possible to use media such as flexible disks, hard disks, optical disks, optical magnetic disks, CD-ROM, CD-R, magnetic tape, non-volatile semi-conductor memory card, or ROM. In addition, the aforementioned function of the embodiment may be actualized by executing the program code read out by the computer.

The aforementioned function of the embodiment can be realized in the case where an OS (operating system) operating on a computer performs part or all of the instructions of the program code.

Moreover, it is possible to have cases where the computer program read out from the storage medium is written into the memory of the enhancement unit connected to the function enhancement board inserted into a computer or a computer. Next, part or all of the instructions of the program code are carried out by the function enhancement board or the CPU of the function expansion unit, and through this process, the function of the aforementioned embodiment can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-037249, filed Feb. 14, 2006, which is hereby incorporated by reference herein in its entirety.

What is claimed is:

1. A display signal control apparatus for generating video data for displaying a broadcast program on a display unit, comprising:
   a generation unit to generate video data that can be displayed in said display unit, of a broadcast program received from broadcast signals;
   an acquiring unit to acquire attribute information from the broadcast signals, the attribute information indicating change timing of content of the broadcast program corresponding to the video data generated by the generation unit; and
   a setting unit to set a video data area which displays the broadcast program in said display unit inside an effective video data area of said video data generated by said generation unit, wherein
   said setting unit changes said video data area at said change timing of the content of the broadcast program according to the attribute information acquired by said acquiring unit.

2. A display signal control apparatus according to claim 1, wherein
   said attribute information of the broadcast program includes information indicating the broadcast start time of said broadcast program, and
   said setting unit changes said video data area at said broadcast start time.

3. A display signal control apparatus according to claim 1, wherein
   a plurality of said video data areas are pre-set by a plurality of coordinate values, and
   said setting unit selects one of said plurality of coordinate values.

4. A display signal control apparatus according to claim 1, further comprising:
   a detecting unit to detect said change timing of the content of the broadcast program based on the attribute information acquired by said acquiring unit,
   wherein the detecting unit detects, as the change timing, at least one of timing at which a next broadcast program starts, timing at which the broadcast program is switched to a commercial message, and timing at which a commercial program is switched to the broadcast program.

5. A display signal control method for generating video data to display a broadcast program in a display unit, comprising:
   a generation step of generating video data that can be displayed in said display unit, of a broadcast program received from broadcast signals;
   an acquiring step of acquiring attribute information from the broadcast signals, the attribute information indicating change timing of content of the broadcast program corresponding to the video data generated in the generation step; and
   a setting step of setting a video data area which displays in said display unit inside an effective video data area of said video data generated by said generation step, wherein
   said setting step changes said video data area at said change timing of the content of the broadcast program according to the attribute information acquired in said acquiring step.

6. The method according to claim 5, wherein
said attribute information includes information indicating the broadcast start time of said broadcast program, and said setting step changes said video data area at said broadcast start time.

7. The method according to claim 5, wherein
   a plurality of said video data area is pre-set by a plurality of coordinate values, and
   said setting step selects one of said plurality of coordinate values.

8. A display signal control method according to claim 5, further comprising:
   a detecting step of detecting said change timing of the content of the broadcast program based on the attribute information acquired in said acquiring step,
   wherein the detecting step detects, as the change timing, at least one of timing at which a next broadcast program starts, timing at which the broadcast program is switched to a commercial message, and timing at which a commercial program is switched to the broadcast program.

9. A non-transitory computer-readable storage medium for storing the computer program for implementing the method according to claim 5.

* * * * *